June 16, 1925.  
W. C. READEKER  
MOTION PICTURE MACHINE  
Original Filed Sept. 10, 1921 3 Sheets-Sheet 1
1,542,409
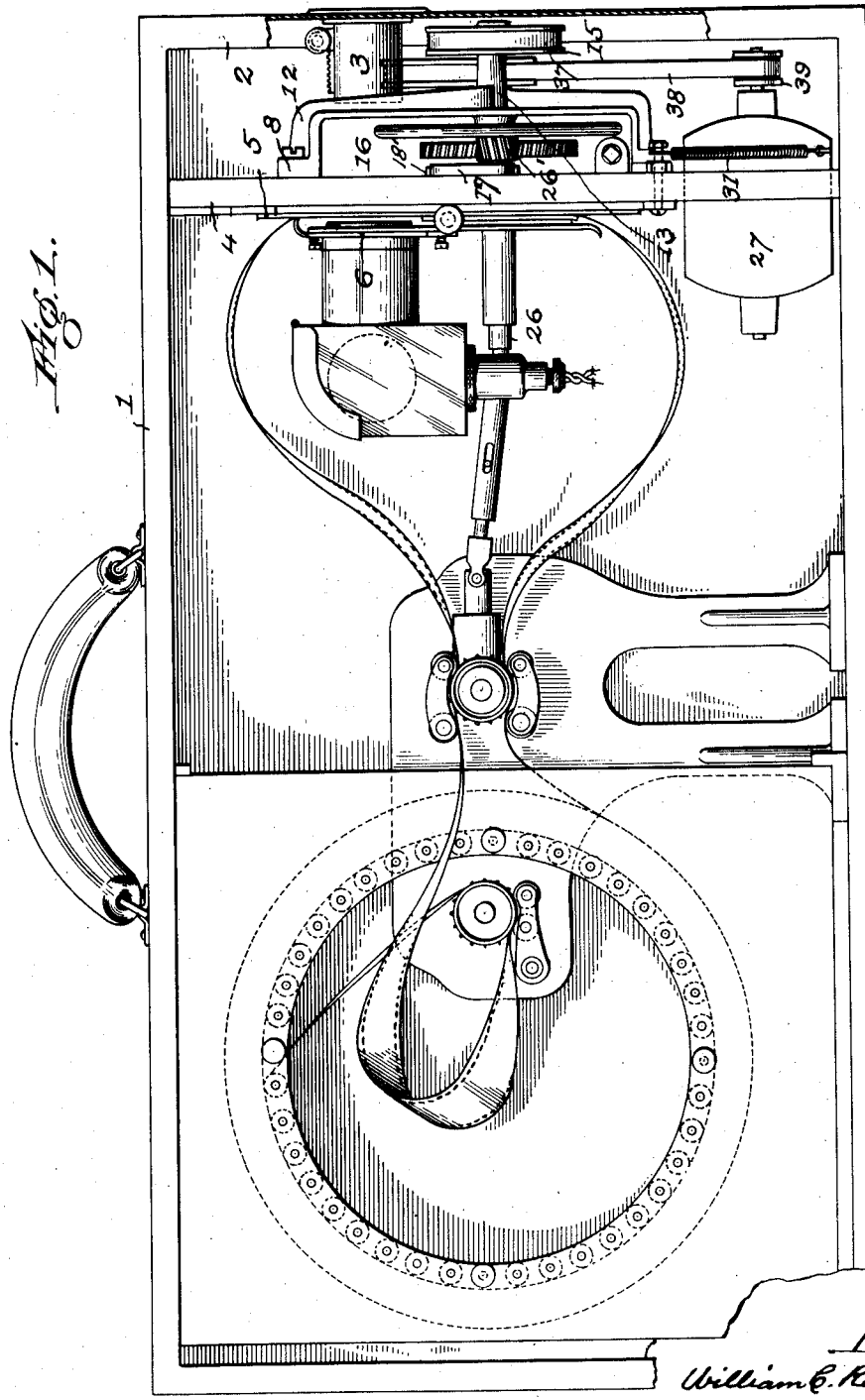

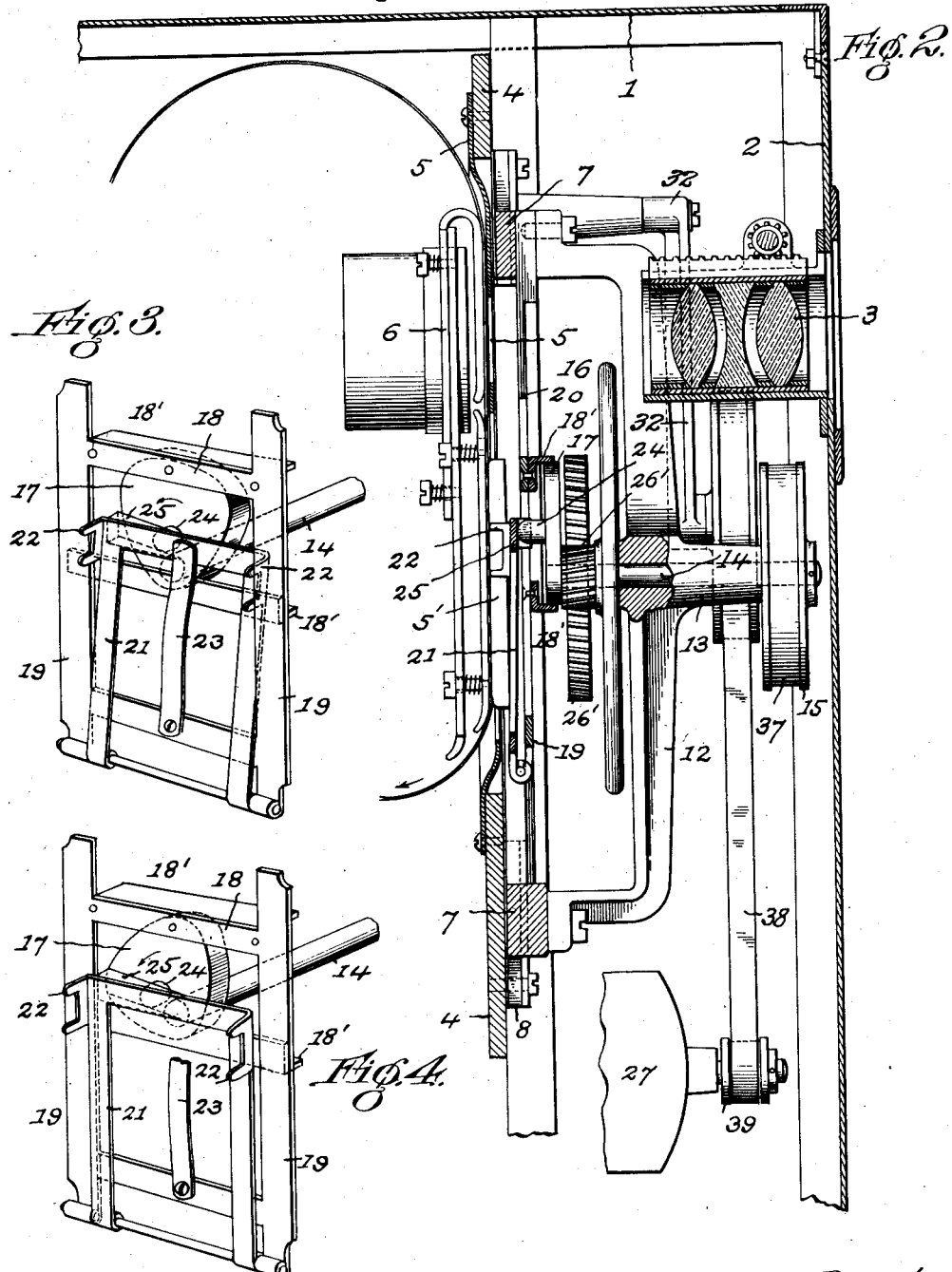

June 16, 1925.
W. C. READEKER
MOTION PICTURE MACHINE
Original Filed Sept. 10, 1921   3 Sheets-Sheet 3
1,542,409
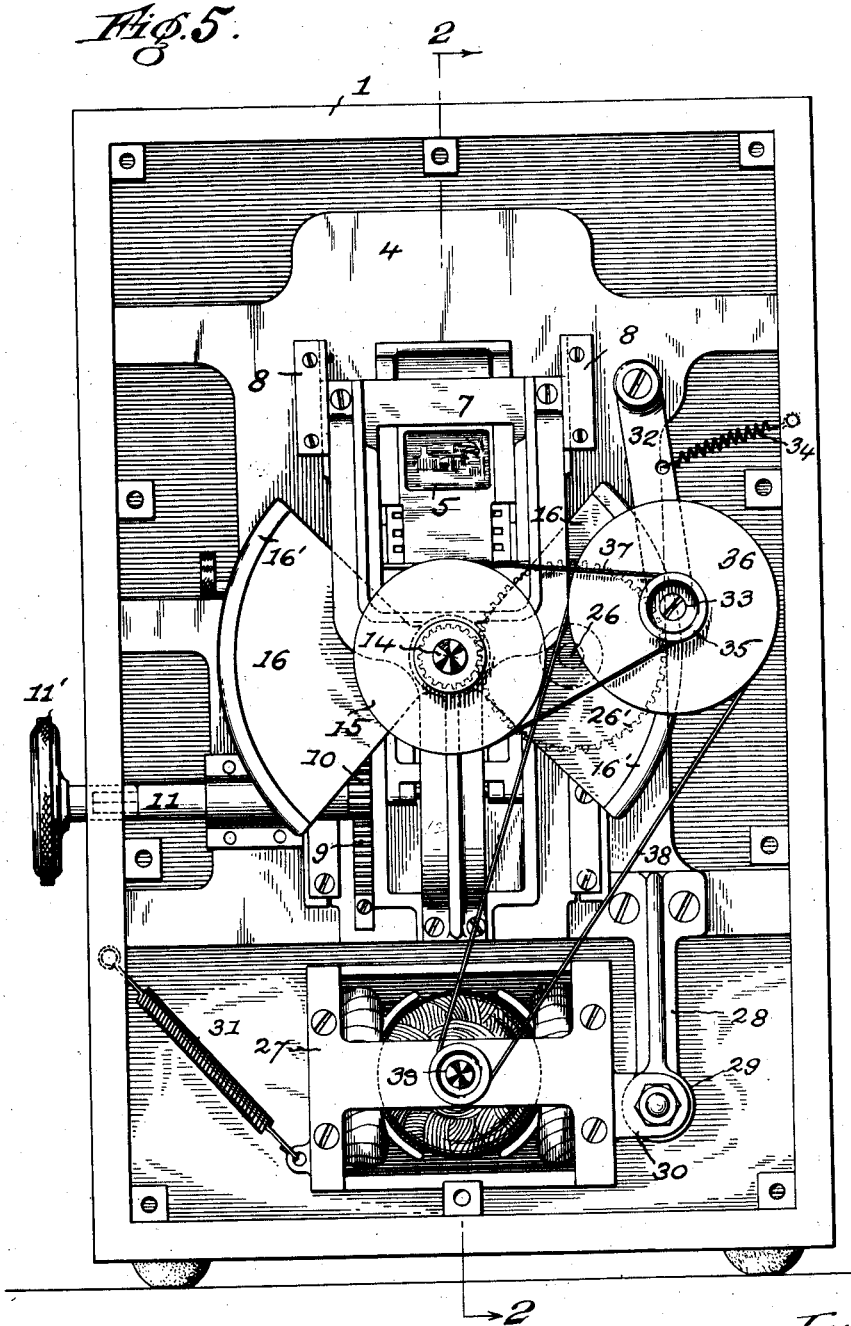

Patented June 16, 1925.

1,542,409

UNITED STATES PATENT OFFICE.

WILLIAM C. READEKER, OF CHICAGO, ILLINOIS, ASSIGNOR, BY DIRECT AND MESNE ASSIGNMENTS, TO CLAREMONT LABORATORIES, INC., A CORPORATION OF NEW YORK.

MOTION-PICTURE MACHINE.

Application filed September 10, 1921, Serial No. 499,658. Renewed May 15, 1924.

*To all whom it may concern:*

Be it known that I, WILLIAM C. READEKER, a citizen of the United States of America, residing at Chicago, in the county of Cook and State of Illinois, have invented certain new and useful Improvements in Motion-Picture Machines, of which the following is a specification.

This invention relates to motion picture machines of the intermittent film feeding type, and has for its objects:—

To provide a structural formation and association of parts whereby in a manual vertical adjustment of the film feeding and allied mechanisms to attain a proper framing of the pictures in the light aperture of the machine, perfect synchronism in the operation of the film feeding mechanism and the light controlling shutter, is maintained.

To provide a simple and efficient formation and arrangement of the parts in an intermittent film feeding mechanism for motion picture machines, in which positive and definite step by step movements are imparted to the picture films, and liability to variation in the length of feed during the succeeding intermittent movements of said film in active use is reduced to a minimum.

To provide a simple and efficient arrangement and correlation of the different carrying shafts of the intermittent film feeding mechanism, film winding and unwinding mechanism and a motor for driving said shafts in unison, and whereby an easy and uniform operation of the parts and mechanisms is attained, all as will hereinafter more fully appear. In the accompanying drawings:—

Fig. 1, is a side elevation of a portable motion picture machine embodying the present improvements, the near wall of the enclosing housing being removed to disclose the inner parts and mechanisms.

Fig. 2, is a detail longitudinal section on line 2—2 Fig. 5.

Figs. 3 and 4 are companion detail perspective views of the intermittent film mechanism and the timed cams and inclines for imparting the required four motion feed to the film engaging claws of the mechanism.

Fig. 5, is a detail front elevation of the film feeding mechanism, light shutter, motor and other parts, the front wall of the enclosing housing being removed to disclose such mechanisms.

Like reference numerals indicate like parts in the several views.

Referring to the drawings, 1 designates the enclosing housing of a portable picture machine, usually of an oblong rectangular form, enclosing and supporting the usual mechanisms and parts by which the picture strip or film is wound, unwound, fed through the intermittent feeding mechanism, past the light controlling shutter and exhibited.

2 designates the front wall of the housing 1, carrying the projecting objective 3 of the machine.

4 designates a skeleton frame or support fixed transversely in the housing 1 and adapted to carry the aperture plate 5, with the light aperture thereof in line with the objective 3 aforesaid, said aperture plate 5 and the associated film confining gate 6, and accessories are preferably of the detail construction and arrangement set forth in my companion application for Letters Patent Serial No. 499,659. And in the present construction, the aperture plate 5 is formed with a pair of vertical slots 5' in transverse spaced relation a distance equal to the spacing between the marginal sprocket perforations of a motion picture film.

7 designates a skeleton frame or carriage sliding in guide 8 on the forward face of the fixed frame 4 aforesaid and provided with a vertical rack or gear 9 in operative engagement with a gear wheel or pinion 10 carried by means as follows.

11 designates a transverse shaft journalled on the frame 4 and carrying on its inner end the pinion 10 aforesaid, and on its outer end and exterior of the housing 1, a hand wheel 11' for convenient manual actuation.

12 designates a centrally arranged bracket or bridge member having upper and lower arms by which it is secured to the adjustable carriage 7 in forward spaced relation thereto as shown in Fig. 2. The upper end of said bracket 12 is preferably of a forked form with the forks thereof positioned outside the respective side margins of the light aperture of the plate 5 and outside the light path of the machine.

13 designates a longitudinally extending bearing sleeve or hub forming a part of the bracket 12 and arranged near the mid-height of the same and a distance below the axis of the objective 3 and the light path of the machine.

14 designates a shaft journalled longitudinally in the hub 13 aforesaid, and carrying parts as follows.

15 designates a belt pulley secured to the forward end of the shaft 14 and having driven connection with an operating motor by means hereinafter described.

16 designates the light shutter of the usual flat bladed type, secured to the shaft 14 near its mid-length with the outer portion of said shutter having movement in a path transverse to, and cutting the light path of the machine. In the present improvement the outer rim of the blades of the shutter 16 is formed with annular enlargements 16' adapted to serve the purpose of a fly wheel in causing an even rotation of the shutter and associated parts and mechanisms carried by the shaft 14.

17 designates a cam member carried on the rear end of the shaft 14 and having apposed peripheral portions concentric with the axis of rotation and adapted to hold an associated cam yoke stationary while said portions of the cam are in moving contact with said cam yoke. The cam member 17 also has opposed peripheral portions eccentric to the axis of rotation and alternating with the aforesaid concentric portions, and adapted to impart motion to the said cam yoke while said eccentric portions are moving in contact with said yoke.

18 designates the cam yoke above referred to and preferably comprising upper and lower transversely arranged bearing plates 18' attached to a carriage 19 moving in vertical guides 20 on the movable frame 7 aforesaid. As so arranged the carriage 19 is adapted to receive an intermittent upward and downward movement from the cam 17 in the operation of the machine.

21 designates a vibratory frame pivoted at its lower end to carriage 19 aforesaid, and carrying at its upper end rearwardly extending claws 22 arranged in a transverse spaced relation corresponding with the transverse spacing of the marginal sprocket perforations of a picture film and adapted to have an angular movement relative to the plane of movement of the carriage 19 in order to enter and operatively engage in said film perforations.

23 designates a spring associated with the carriage 19 and frame 21 and adapted to yieldingly force the frame 21 and its claws 22 away from the aforesaid engagement with the picture film.

24 designates a rearwardly projecting stud or head on the cam member 17 in eccentric relation to the axis of rotation of said cam and adapted to have operative connection with a cam or inclined face lug on the vibratory frame 21 as follows.

25 designates a transversely arranged cam or inclined face lug secured to the forward and upper face of the frame 21 and to one side of the same, as shown more particularly in Figs. 3 and 4, and adapted for intermittent operative engagement with the end of the aforesaid head or stud 24. The relative arrangement of the above parts and their operation to attain an intermittent travel of the picture film is as follows.

With the concentric portion of the cam member 17 most remote from the axis of rotation and moving in contact with the upper bearing plate 18', the carriage 19 is held against vertical movement. At the same time the stud or head 24 moves upon the inclined lug 25 and forces the upper end of the vibratory frame 21 rearward and brings the claws 22 into engagement with the marginal perforations of the picture film, and holds the parts in such engaged condition while an eccentric portion of the cam 17 preceding the concentric portion above referred to has moving contact with a lower bearing bar 18' to impart downward movement to the carriage 19 and to the vibratory frame 21 carried thereon, with the claws 22 in engagement with the perforations of the picture film so that a downward feed of said picture film is attained corresponding with the distance between adjacent pictures on said film.

With a termination of the moving contact of the eccentric portion of the cam member 17 above described, the concentric portion of the cam member has movement in contact with the lower bearing bar 18' aforesaid, to hold the carriage 19 against vertical movement. At the same time the stud or head 24 moves in a reverse direction to that above described upon the cam or inclined lug 25 and permits the spring 23 to force the vibratory frame 21 forward and withdraw its claws 22 from operative engagement with the marginal perforations of the picture film. In other words, the frame 21 is vibrated or moved in an angular direction relative to the plane of movement of the carriage 19, and the claws 22 are engaged in the film perforations at the end of the reciprocating movement of the carriage in one direction and maintained in engagement therewith during the movement of the carriage in the opposite direction, said frame 21 at the end of the latter movement of the carriage being returned to its normal position by the spring 23.

With the termination of the holding contact of said concentric portion of the cam member 17, with the lower bearing bar 18′ the preceding eccentric portion of said cam moves into operative engagement with the upper bearing bar 18′ to impart an upward travel to the carriage 19 and to the vibratory frame carried thereon, and with the claws 22 wholly out of engagement with the marginal perforations of the picture film so that no movement of the film will take place during that portion of the cycle of operations just described. The described arrangement of parts is adapted to attain a simple and very efficient intermittent feed of the picture film through the light path of the machine.

26 designates a countershaft journalled in the movable frame 7 and arranged in parallel relation with the cam and shutter carrying shaft 14 and operatively connected thereto by a pair of gear wheels 26′. The rear end of the countershaft 26 is adapted to have driving connections with a film winding and unwinding mechanism, such as forms the subject matter of my aforesaid companion application Serial No. 499,657.

27 designates a motor, usually of the electric type and having an armature shaft extending longitudinally in the machine housing 1. In the present construction the motor 27 is mounted in the forward portion of the housing 1, beneath the film feeding mechanism, etc., above described and by means as follows.

28 designates a hanger bar depending from the fixed frame 4 aforesaid, and having at its lower end a pivot eye 29 for pivotal engagement with a pivot lug 30 on one side of the motor 27.

31 designates a spring arranged between the fixed frame 4 and the side of the motor 27 opposite to that carrying the pivot lug 30, and adapted to exert a yielding upward stress upon the motor in opposition to the downward tendency of said motor by gravity. In practice the force or upward pull of the spring 31 will be less than the downward tendency of the motor due to weight and gravity, so that a portion of the weight of the motor will be effective in tightening the belt connections now to be described.

32 designates a pendant radius link pivoted at its upper end to the fixed frame 4 aforesaid, and carrying an idler shaft 33 at its lower end, with said shaft in approximately the same plane as that of the carrying shaft 14 of the light shutter and film feeding mechanism aforesaid.

34 designates a tension spring associated with the radius link 32 and adapted to pull said link in a direction away from the shaft 14 aforesaid.

35 and 36 designate belt pulleys on the idler shaft 33 aforesaid, with the pulley 35 connected by a belt 37 with the pulley 15 of the carrying shaft 14 of the light shutter and film feeding mechanism, and with the pulley 36 connected by a belt 38 with a pulley 39 on the forward end of the armature shaft of the motor 27, to afford the necessary driving connections between the parts and permit of the vertical adjustment of the light shutter and film feeding mechanism in the continued use of the machine.

Having thus fully described my invention what I claim as new and desire to secure by Letters Patent, is:—

1. In a motion picture machine, the combination of a plate formed with a light aperture, a shaft arranged in right angle relation to said plate and a distance removed from the aperture thereof, a bladed light controlling shutter on said shaft, and an intermittent film feeding mechanism, the same comprising a carriage in parallel relation to said aperture plate, a frame carrying film engaging claws on said carriage, a cam on the aforesaid shaft provided with peripheral concentric and eccentric portions adapted to engage said carriage and impart intermittent reciprocation thereto, and a stud arranged eccentrically on the face of said cam, the claw carrying frame having an inclined lug on one face adapted for engagement with the stud of the cam aforesaid to receive intermittent motion therefrom in a direction at right angles to that of the aforesaid carriage.

2. In a motion picture machine, the combination of a plate formed with a light aperture, a shaft arranged in right angle relation to said plate and a distance removed from the aperture thereof, a bladed light controlling shutter on said shaft, and an intermittent film feeding mechanism, the same comprising a carriage in parallel relation to said aperture plate, a frame carrying film engaging claws at one end and pivoted at its other end on said carriage, a cam on the aforesaid shaft provided with peripheral concentric and eccentric portions adapted to engage said carriage and impart intermittent reciprocation thereto, and a stud arranged eccentrically on the face of said cam, the claw carrying frame having an inclined lug on one face adapted for engagement with the stud of the cam aforesaid to receive intermittent motion therefrom in a direction at right angles to that of the aforesaid carriage.

3. In a motion picture machine, the combination of a plate formed with a light aperture, a shaft arranged in right angle relation to said plate and a distance removed from the aperture thereof, a bladed light controlling shutter on said shaft, and an intermittent film feeding mechanism, the same comprising a carriage in parallel relation to said aperture plate, a frame carrying film engaging claws on said carriage, a cam on the aforesaid shaft provided with peripheral concentric and eccentric portions adapted to engage said carriage and impart intermittent reciprocation thereto, and a stud arranged eccentrically on the face of of said cam, the claw carrying frame having an inclined lug on one face to one side of the center line of said face and adapted for engagement with the stud of the cam aforesaid to receive intermittent motion therefrom in a direction at right angles to that of the aforesaid carriage.

4. In a motion picture machine, the combination of a plate formed with a light aperture, a shaft arranged in right angle relation to said plate and a distance removed from the aperture thereof, a bladed light controlling shutter on said shaft, and an intermittent film feeding mechanism, the same comprising a carriage in parallel relation to said aperture plate, a frame, carrying film engaging claws at one end and pivoted at its other end on said carriage, a cam on the aforesaid shaft provided with peripheral concentric and eccentric portions adapted to engage said carriage and impart intermittent reciprocation thereto, and a stud arranged eccentrically on the face of said cam, the claw carrying frame having an inclined lug on one face to one side of the center line of said face and adapted for engagement with the stud of the cam aforesaid to receive intermittent motion therefrom and in a direction at right angles to that of the aforesaid carriage.

5. In a motion picture machine, the combination of a plate formed with a light aperture, a shaft arranged in right angle relation to said plate and a distance removed from the aperture thereof, a bladed light controlling shutter on said shaft, an intermittent film feeding mechanism, the same comprising a carriage in parallel relation to said aperture plate, a frame on said carriage carrying film engaging claws, a cam on the aforesaid shaft provided with peripheral concentric and eccentric portions adapted to engage said carriage and impart intermittent reciprocation thereto, a stud arranged eccentrically on the face of the cam, the claw carrying frame having an inclined lug on one face adapted for engagement with the stud of the cam aforesaid to receive intermittent motion therefrom in a direction at right angles to that of the aforesaid carriage, and a spring adapted to impart movement to the claw carrying frame in a direction opposite to that imparted by the stud and lug aforesaid.

6. In an intermittent feeding mechanism for perforated motion picture films, the combination of a guide plate for the picture film, a carriage movable in parallel relation to said guide plate, a frame on said carriage carrying film engaging claws, a shaft in right angle relation to said carriage and frame, and a cam on said shaft provided with peripheral concentric and eccentric portions adapted to engage said carriage and impart intermittent reciprocation thereto, and a stud arranged eccentrically on the face of said cam, the claw carrying frame having an inclined lug on one face adapted for engagement with said stud to receive intermittent motion therefrom in a direction at right angles to that of the aforesaid carriage.

7. In an intermittent feeding mechanism for perforated motion picture films, the combination of a guide plate for the picture film, a carriage movable in parallel relation to said guide plate, a frame carrying film engaging claws at one end and pivoted at the other end to said carriage, a shaft in right angle relation to said carriage and frame, a cam on said shaft provided with peripheral concentric and eccentric portions adapted to engage said carriage and impart intermittent reciprocation thereto, and a stud arranged eccentrically on the face of said cam, the claw carrying frame having an inclined lug on one face adapted for engagement with said stud to receive intermittent motion therefrom in a direction at right angles to that of the aforesaid carriage.

8. In an intermittent feeding mechanism for perforated motion picture films, the combination of a guide plate, for the picture film, a carriage movable in parallel relation to said guide plate, a frame on said carriage carrying film engaging claws, a shaft in right angle relation to said carriage and frame, and a cam on said shaft provided with peripheral concentric and eccentric portions adapted to engage said carriage and impart intermittent reciprocation thereto, and a stud arranged eccentrically on the face of said cam, the claw carrying frame having an inclined lug on one face to one side of the center line of said face adapted for engagement with said stud to receive intermittent motion therefrom in a direction at right angles to that of the aforesaid carriage.

9. In an intermittent feeding mechanism for perforated motion picture films, the combination of a guide plate for the picture film, a carriage movable in parallel relation to said guide plate, a frame carrying film engaging claws at one end and pivoted at the other end to said carriage, a shaft in right angle relation to said carriage and frame, a cam on said shaft provided with peripheral concentric and eccentric portions adapted to engage said carriage and impart intermittent reciprocation thereto, and a stud arranged eccentrically on the face of said cam, the claw carrying frame having an inclined lug on one face to one side of the center line of said face adapted for engagement with said stud to receive intermittent motion therefrom in a direction at right angles to that of the aforesaid carriage.

10. In an intermittent feeding mechanism for perforated motion picture films, the combination of a guide plate for the picture film, a carriage movable in parallel relation to said guide plate, a frame on said carriage carrying film engaging claws, a shaft in right angle relation to said carriage and frame, a cam on said shaft provided with peripheral concentric and eccentric portions adapted to engage said carriage and impart intermittent reciprocation thereto, a stud arranged eccentrically on the face of said cam, the claw carrying frame having an inclined lug on one face adapted for engagement with said stud to receive intermittent motion therefrom in a direction at right angles to that of the aforesaid carriage and a spring adapted to impart movement to the claw carrying frame in a direction opposite to that imparted by the stud and lug aforesaid.

11. In an intermittent feeding mechanism for perforated motion picture films, the combination of a guide plate for the picture films, a carriage movable in parallel relation to said guide plate, a frame carrying film engaging claws at one end and pivoted at the other end to said carriage, a shaft in right angle relation to said carriage and frame, a cam on said shaft provided with peripheral concentric and eccentric portions adapted to engage said carriage and impart intermittent reciprocation thereto, a stud arranged eccentrically on the face of said cam, the claw carrying frame having an inclined lug on one face adapted for engagement with said stud to receive intermittent motion therefrom in a direction at right angles to that of the aforesaid carriage, and a spring adapted to impart movement to the claw carrying frame in a direction opposite to that imparted by the stud and lug aforesaid.

12. In an intermittent feeding mechanism for perforated motion picture films, the combination of a guide plate for the picture film, a carriage movable in parallel relation to said guide plate, a frame on said carriage carrying film engaging claws, a shaft in right angle relation to said carriage and frame, a cam on said shaft provided with peripheral concentric and eccentric portions adapted to engage said carriage and impart intermittent reciprocation thereto, a stud arranged eccentrically on the face of said cam, the claw carrying frame having an inclined lug on one face to one side of the center line of said face and adapted for engagement with said stud to receive intermittent motion therefrom in a direction at right angles to that of the aforesaid carriage, and a spring adapted to impart movement to the claw carrying frame in a direction opposite to that imparted by the stud and lug aforesaid.

13. In an intermittent feeding mechanism for perforated motion picture films, the combination of a guide plate for the picture film, a carriage movable in parallel relation to said guide plate, a frame carrying film engaging claws at one end and pivoted at the other end to said carriage, a shaft in right angle relation to said carriage and frame, a cam on said shaft provided with peripheral concentric and eccentric portions adapted to engage said carriage and impart intermittent reciprocation thereto, a stud arranged eccentrically on the face of said cam, the claw carrying frame having an inclined lug on one face to one side of the center line of said face and adapted for engagement with said stud to receive intermittent motion therefrom in a direction at right angles to that of the aforesaid carriage, and a spring adapted to impart movement to the claw carrying frame in a direction opposite to that imparted by the stud and lug aforesaid.

14. In an intermittent feeding mechanism for perforated motion picture films, the combination of a stationary support, a frame having movement in guides on said support, manual means for imparting movement to said frame, a carriage mounted for reciprocation on said frame, a frame on said carriage carrying film engaging claws, a shaft in right angle relation to said support, and a cam on said shaft provided with peripheral concentric and eccentric portions adapted to engage said carriage and impart reciprocation thereto, and a stud arranged eccentrically on the face of said cam, the claw carrying frame having an inclined lug on one face adapted for engagement with said stud to receive intermittent motion therefrom in a direction at right angles to that of the aforesaid carriage.

15. In an intermittent feeding mechanism for perforated motion picture films, the combination of a stationary support, a frame having movement in guides in said support, manual means for imparting movement to said frame, a carriage mounted for reciprocation on said frame, a frame carrying film engaging claws at one end and pivoted at the other end to said carriage, a shaft in right angle relation to said support, a cam on said shaft provided with peripheral concentric and eccentric portions adapted to engage said carriage and impart intermittent reciprocation thereto, and a stud arranged eccentrically on the face of said cam, the claw carrying frame having an inclined lug on one face adapted for engagement with said stud to receive intermittent motion therefrom in a direction at right angles to that of the aforesaid carriage.

16. In an intermittent feeding mechanism for perforated motion picture films, the combination of a stationary support, a frame having movement in guides on said support, manual means for imparting movement to said frame, a carriage mounted for reciprocation on said frame, a frame on said carriage carrying film engaging claws, a shaft in right angle relation to said support, and a cam on said shaft provided with peripheral concentric and eccentric portions adapted to engage said carriage and impart reciprocation thereto, and a stud arranged eccentrically on the face of said cam, the claw carrying frame having an inclined lug on one face to one side of the center line of said face adapted for engagement with said stud to receive intermittent motion therefrom in a direction at right angles to that of the aforesaid carriage.

17. In an intermittent feeding mechanism for perforated motion picture films, the combination of a stationary support, a frame having movement in guides in said support, manual means for imparting movement to said frame, a carriage mounted for reciprocation on said frame, a frame carrying film engaging claws at one end and pivoted at the other end to said carriage, a shaft in right angle relation to said support, a cam on said shaft provided with peripheral concentric and eccentric portions adapted to engage said carriage and impart intermittent reciprocation thereto, and a stud arranged eccentrically on the face of said cam, the claw carrying frame having an inclined lug on one face to one side of the center line of said face adapted for engagement with said stud to receive intermittent motion therefrom in a direction at right angles to that of the aforesaid carriage.

18. In an intermittent feeding mechanism for perforated motion picture films, the combination of a stationary support, a frame having movement in guides on said support, manual means for imparting movement to said frame, a carriage mounted for reciprocation on said frame, a frame said carriage carrying film engaging claws, a shaft in right angle relation to said support, and a cam on said shaft provided with peripheral concentric and eccentric portions adapted to engage said carriage and impart intermittent reciprocation thereto, a stud arranged eccentrically on the face of said cam, the claw carrying frame having an inclined lug on its face adapted for engagement with said stud to receive intermittent motion therefrom in a direction at right angles to that of the aforesaid carriage, and a spring adapted to impart movement to the claw carrying frame in a direction opposite to that imparted by the stud and lug aforesaid.

19. In an intermittent feeding mechanism for perforated motion picture films, the combination of a stationary support, a frame having movement in guides on said support, manual means for imparting movement to said frame, a carriage mounted for reciprocation on said frame, a frame carrying film engaging claws at one end and pivoted at the other end to said carriage, a shaft in right angle relation to said support, a cam on said shaft provided with peripheral concentric and eccentric portions adapted to engage said carriage and impart intermittent reciprocation thereto, a stud arranged eccentrically on the face of said cam, the claw carrying frame having an inclined lug on one face adapted for engagement with said stud to receive intermittent motion therefrom in a direction at right angles to that of the aforesaid carriage, and a spring adapted to impart movement to the claw carrying frame in a direction opposite to that imparted by the stud and lug aforesaid.

20. In an intermittent feeding mechanism for perforated motion picture films, the combination of a stationary support, a frame having movement in guides on said support, manual means for imparting movement to said frame, a carriage mounted for reciprocation on said frame, a frame on said carriage carrying film engaging claws, a shaft in right angle relation to said support, and a cam on said shaft provided with peripheral concentric and eccentric portions adapted to engage said carriage and impart intermittent reciprocation thereto, a stud arranged eccentrically on the face of said cam, the claw carrying frame, having an inclined lug on its face to one side of the center line of said face adapted for engagement with said stud to receive intermittent motion therefrom in a direction at right angles to that of the aforesaid carriage, and a spring adapted to impart movement to the claw carrying frame in a direction opposite to that imparted by the stud and lug aforesaid.

21. In an intermittent feeding mechanism for perforated motion picture films, the combination of a stationary support, a frame having movement in guides on said support, manual means for imparting movement to said frame, a carriage mounted for reciprocation on said frame, a frame carrying film engaging claws at one end and pivoted at the other end to said carriage, a shaft in right angle relation to said support, a cam on said shaft provided with peripheral concentric and eccentric portions adapted to engage said carriage and impart intermittent reciprocation thereto, a stud arranged eccentrically on the face of said cam, the claw carrying frame having an inclined lug on one face to one side of the center line of said face adapted for engagement with said stud to receive intermittent motion therefrom in a direction at right angles to that of the aforesaid carriage, and a spring adapted to impart movement to the claw carrying frame in a direction opposite to that imparted by the stud and lug aforesaid.

22. In an intermittent feeding mechanism for perforated motion picture films, the combination of a stationary support, a frame having movement in guides on said support, manual means for imparting movement to said frame, a carriage, mounted for reciprocation on said frame, a frame on said carriage carrying film engaging claws, a shaft in right angle relation to said support, and a cam on said shaft provided with peripheral concentric and eccentric portions adapted to engage said carriage and impart intermittent reciprocation thereto, a stud arranged eccentrically on a face of said cam, the claw carrying frame having an inclined lug on one face adapted for engagement with said stud to receive intermittent motion therefrom in a direction at right angles to that of the aforesaid carriage, a motor arranged beneath the cam carrying shaft with its power shaft in parallel relation to said cam shaft, a radius link carrying a pair of idler pulleys arranged laterally of said cam shaft, pulleys on the respective shafts, and endless belt connections between the motor shaft and one idler pulley and between the other idler pulley and the cam shaft.

23. In an intermittent feeding mechanism for perforated motion picture films, the combination of a stationary support, a frame having movement in guides in said support, manual means for imparting movement to said frame, a carriage mounted for reciprocation on said frame, a frame carrying film engaging claws at one end pivoted at the other end to said carriage, a shaft in right angle relation to said support, a cam on said shaft provided with peripheral concentric and eccentric portions adapted to engage said carriage and impart intermittent reciprocation thereto, a stud arranged eccentrically on a face of said cam, the claw carrying frame having an inclined lug on one face adapted for engagement with said stud to receive intermittent motion therefrom in a direction at right angles to that of the aforesaid carriage, a motor arranged beneath the cam carrying shaft with its power shaft in parallel relation to said cam shaft, a radius link carrying a pair of idler pulleys arranged laterally of said cam shaft, pulleys on the respective shafts, and endless belt connections between the motor shaft and one idler pulley and between the other idler pulley and the cam shaft.

24. In an intermittent feeding mechanism for perforated motion picture films, the combination of a stationary support, a frame having movement in guides on said support, manual means for imparting movement to said frame, a carriage mounted for reciprocation on said frame, a frame on said carriage carrying film engaging claws, a shaft in right angle relation to said support, and a cam on said shaft provided with peripheral concentric and eccentric portions adapted to engage said carriage and impart intermittent reciprocation thereto, a stud arranged eccentrically on a face of said cam, the claw carrying frame having an inclined lug on one face adapted for engagement with said stud to receive intermittent motion therefrom in a direction at right angles to that of the aforesaid carriage, a counter shaft journalled in the aforesaid movable frame in parallel relation to the cam shaft and adapted for operative connection with a film winding and unwinding mechanism, and gearing connections between said countershaft and the cam shaft.

25. In an intermittent feeding mechanism for perforated motion picture films, the combination of a stationary support, a frame having movement in guides in said support, manual means for imparting movement to said frame, a carriage mounted for reciprocation on said frame, a frame carrying film engaging claws at one end and pivoted at the other end to said carriage, a shaft in right angle relation to said support, a cam on said shaft provided with peripheral concentric and eccentric portions adapted to engage said carriage and impart intermittent reciprocation thereto, a stud arranged eccentrically on a face of said cam, the claw carrying frame having an inclined lug on one face adapted for engagement with said stud to receive intermittent motion therefrom in a direction at right angles to that of the aforesaid carriage, a countershaft journalled in the aforesaid movable frame in parallel relation to the cam shaft and adapted for operative connection with a film winding and unwinding mechanism, and gearing connections between said countershaft and the cam shaft.

26. In a film feeding mechanism for motion picture machines, a carriage mounted for vertical reciprocating movement, a film engaging member mounted upon said carriage for movement in an angular direction relative to the plane of reciprocating movement of said carriage, an actuating member for reciprocating said carriage, and co-acting means on said actuating member and the film engaging member to move the latter relative to the carriage and operatively engage the same with the film to impart a positive movement to the film past the light aperture during movement of said carriage in one direction.

27. In a film feeding mechanism for motion picture machines, a carriage mounted for vertical reciprocating movement, a film engaging member pivotally mounted upon one side of said carriage for movement in an angular direction relative to the plane of movement of said carriage, a rotary cam element co-acting with parts of the carriage to intermittently reciprocate the same, and co-acting means on said cam element and the film engaging member for moving said member into positive engagement with the film at the end of the reciprocating movement of the carriage in one direction to impart a positive movement to the film with the carriage during the movement of the latter in the opposite direction.

28. In a film feeding mechanism for motion picture machines, a carriage mounted for vertical reciprocating movement, a film engaging member pivotally mounted upon one side of the carriage for angular movement with respect to the plane of movement of said carriage, means for imparting an intermittent reciprocation to the carriage, said means having a part co-acting with a part on said film engaging member to move the latter into positive engagement with the film at the end of the reciprocating movement of the carriage in one direction and maintain such engagement of the member with the film during the movement of the carriage in the opposite direction, whereby a positive movement of definite duration is imparted to the film past the light aperture, and additional means for moving said film engaging member upon the carriage out of engagement with the film at the end of the latter reciprocating movement of the carriage.

29. In a film feeding mechanism for motion picture machines, a vertically reciprocating carriage, a claw member pivotally mounted upon the carriage for movement in an angular direction relative to the plane of movement of said carriage and adapted for engagement in the perforations of the film, a rotary cam co-acting with parts of the carriage to reciprocate the latter, means yieldingly urging said claw member to a normal position on the carriage out of contact with the film, and co-acting parts on said claw member and the cam for moving the claw member into engagement with the film perforations at the end of the reciprocating movement of the carriage in one direction and maintaining such engagement of the claw member with the film during the movement of said carriage in the opposite direction whereby a definite duration of movement of the film past the light aperture is effected.

30. In a film feeding mechanism for motion picture machines, a carriage mounted upon one side of the film aperture plate for vertical reciprocating movement, a claw member pivotally mounted upon the carriage for movement in an angular direction relative to the plane of movement of said carriage and adapted for engagement in the perforations of the film, a spring yieldingly urging said member into normal position upon the carriage out of contact with the film, said carriage having spaced parts, a rotary cam positioned between the spaced parts and co-acting therewith to impart an intermittent reciprocating movement to the carriage, said claw member having a cam lug, and said rotary cam having a part co-acting with said cam lug to engage the claw member in perforations of the film at the end of the reciprocating movement of the carriage in one direction and maintain such engagement during the reciprocating movement of the carriage in the opposite direction, whereby a feeding movement of definite duration is imparted to the film past the light aperture.

31. In a film feeding mechanism for motion picture machines, a carriage mounted for vertical reciprocating movement, a film engaging member mounted upon said carriage for movement in an angular direction relative to the plane of reciprocating movement of said carriage, a rotary cam element coacting with parts of the carriage to intermittently reciprocate the same, and coacting means on said cam element and the film engaging member for moving said member into positive engagement with the film at the end of the reciprocating movement of the carriage in one direction to impart a positive movement to the film with the carriage during the movement of the latter in the opposite direction.

Signed at Chicago, Illinois, this 7th day of September 1921.

WILLIAM C. READEKER.